United States Patent Office 3,784,571
Patented Jan. 8, 1974

3,784,571
ORGANIC ACID ADDITION SALTS OF 1-(BUTYL-CARBAMOYL) - 2-(METHYLAMINO)-BENZIMID-AZOLE AND METHOD FOR PREPARING THE SAME
Dale I. Dodds, 1830 S. 8th St., Alhambra, Calif. 91803
No Drawing. Filed May 15, 1972, Ser. No. 254,771
Int. Cl. C07d 49/38
U.S. Cl. 260—309.2
18 Claims

ABSTRACT OF THE DISCLOSURE

1 - (butylcarbamoyl) - 2 - (methylamino)-benzimidazolium salts are prepared by heating methyl 1-(butylcarbamoyl) - 2 - benzimidazolecarbamate and an organic acid having from 1 to about 6 carbon atoms, such as lactic acid, in a polar solvent, such as dimethyl sulfoxide, to a temperature between about 175 and 315 degrees F. The benzimidazolium salts are effective in the control of certain plant fungus disease.

BACKGROUND OF THE INVENTION

This invention relates to fungicidal compositions. More particularly, it relates to 1-(butylcarbamoyl)-2-(methylamino)-benzimidazolium salts, a method for preparing the same and the use thereof in the control of plant fungus disease.

Prior art

In view of the destructive effect of pathogenic fungi on trees and other plants, there is a need for an effective systemic fungicide for controlling such fungi. A composition which has been found to have high toxicity and good residual protectant activity against a number of pathogenic fungi as well as a high level of plant safety is methyl 1 - (butylcarbamoyl) - 2 - benzimidazolecarbamate. This composition, for which the generic name benomyl has been adopted, has the following structural formula:

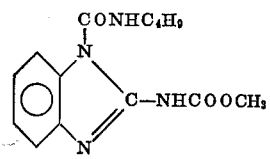

Although benomyl has shown a high degree of preventative and therapeutic activity against a wide range of pathogenic fungi, its practical application to trees and other plants has been limited because of its very low solubility characteristics in aqueous system.

Objects

Accordingly, the principal object of this invention is to provide a composition derived from benomyl which has the advantages of benomyl, namely, signficant fungitoxicity with little or no phytotoxicity but which has substantially improved solubility characteristics in aqueous systems.

A further object of this invention is to provide a method for preparing the 1-(butylcarbamoyl)-2-(methylamino) benzimidazolium salt of an organic acid having from 1 to about 6 carbon atoms.

A still further object of this invention is to provide a method for controlling pathogenic fungi by treating plants with a 1 - (butylcarbamoyl)-2-(methylamino)-benzimidazolium salt.

SUMMARY OF THE INVENTION

In accordance with one of its aspects, this invention is directed to a composition comprising the 1-(butylcarbamoyl) - 2 - (methylamino) - benzimidazolium salt of an organic acid having from 1 to about 6 carbon atoms.

In a second aspect, this invention is directed to a method for preparing the 1-(butylcarbamoyl)-2-(methylamino)-benzimidazolium salt of an organic acid having from 1 to about 6 carbon atoms which comprises heating methyl 1-(butylcarbamoyl) - 2 - benzimidazolecarbamate and an organic acid having from 1 to about 6 carbon atoms in a polar solvent to a temperature from about 175 degrees F. to about 315 degrees F., wherein the polar solvent has a pH from about 3.5 to about 5.8 and a boiling point in excess of the heating temperature. In a third aspect, this invention is directed to a method for controlling pathogenic fungi which comprises treating plants with a composition containing the 1 - (butylcarbamoyl) - 2 - (methylamino)-benzimidazolium salt of an organic acid having from 1 to about 6 carbon atoms.

Detailed description

The compositions of this invention comprises 1-(butylcarbamoyl) - 2 - (methylamino)-benzimidazolium salts of an organic acid having from 1 to about 6 carbon atoms. The benzimidazolium salts have the following structural formula:

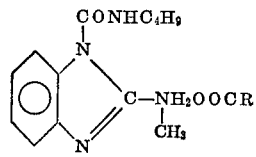

wherein the acyloxy group, RCOO, has from 1 to about 6 carbon atoms.

Examples of benzimidazolium salts falling within the scope of this invention include:

1-(butylcarbamoyl)-2-(methylamino)-benzimidazolium lactate;
1-(butylcarbamoyl)-2-(methylamino)-benzimidazolium ascorbate;
1-(butylcarbamoyl)-2-(methylamino)-benzimidazolium glycolate;
1-(butylcarbamoyl)-2-(methylamino)-benzimidazolium malate;
1-(butylcarbamoyl)-2-(methylamino)-benzimidazolium tartrate;
1-(butylcarbamoyl)-2-(methylamino)-benzimidazolium fumarate;
1-(butylcarbamoyl)-2-(methylamino)-benzimidazolium malonate;
1-(butylcarbamoyl)-2-(methylamino)-benzimidazolium oxalate;
1-(butylcarbamoyl)-2-(methylamino)-benzimidazolium succinate;
1-(butylcarbamoyl)-2-(methylamino)benzimidazolium acetate; and,
1-(butylcarbamoyl)-2-(methylamino)-benzimidazolium chloroacetate.

The benzimidazolium salts are prepared by heating benomyl and an organic acid having from 1 to about 6 carbon atoms in a polar solvent to a temperature between about 175 degrees F. and about 315 degrees F. Benomyl and the organic acid are, typically, reacted in about stoichiometric proportions, although a slight excess of acid is desirable.

The solvent for the reaction is a polar solvent which has the following properties: (a) the ability to dissolve benomyl either with or without the application of heat, (b) a chemical composition which produces minimal phytotoxic effects on trees and other plants and produces products of decomposition which are compatible with the metabolism of trees and plants, (c) a pH between about 3.5 and about 5.8 and (d) a minimum boiling point of 250 degrees F. with an actual boiling point in excess of the temperature of the heating step.

Examples of polar solvents in which the reaction can be carried out and which meet the foregoing requirements are: dimethyl sulfoxide, diethylene glycol ethyl ether N,N-dimethylacetamide and dimethylformamide.

The organic acids which can be used to prepare the benzimidazolium salts from benomyl include hydroxy substituted carboxylic acids, hydroxy substituted polycarboxylic acids, unsubstituted carboxylic acids and chloro-substituted carboxylic acids. Specific examples of such acids are lactic, ascorbic, citric, glycolic, malic, tartaric, fumaric, malonic, oxalic, succinic, acetic and chloroacetic acids. The preferred organic acids are lactic and ascorbic acids.

The volume of solvent in which the reaction is carried out is such that the resulting salt solution has a salt concentration of up to about 14 percent by weight, as, for example, from about 8 to about 14 percent by weight. Upon completion of the heating and reaction step, additional solvent is added to the salt solution, when necessary, to provide a suitable salt concentration for use applications and to impart good shelf stability to the product.

The benzimidazolium salt solutions are compatible with the sap streams of trees and other plants and may be diluted extensively with water without encountering any significant flocculation. It should be noted in this connection that polar solvent solutions of benomyl rapidly precipate or flocculate in the presence of water.

The salt solutions of this invention can be applied to trees and other plants through stem injection, as a foliar spray or by soil treatment.

The salt concentration in the polar solvent for use application is generally in the range from about 0.01 to about 10.0 percent by weight, with an intermediate range being from about 0.25 to about 7.0 percent by weight and a preferred range being from about 0.5 to about 3.0 percent by weight.

When the benzimidazolium salt solution is to be injected directly into the trunk of a tree as, for example, by the method described in U.S. Pat. No. 3,304,655, it has been found that good results are achieved at a salt concentration of about one percent by weight. Polar solvent solutions containing up to about 7.0 percent by weight of the benzimidazolium salt can be diluted with water to provide a one percent solution for use as a foliar spray or for soil treatment.

Elm trees infested with Dutch elm disease and olive trees infested with verticilium wilt were treated by stem injection with a one percent solution, by weight, of 1-(butylcarbamoyl)-2-(methylamino) - benzimidazolium lactate in dimethyl sulfoxide. The salt solution was introduced into the trees through Mauget pressurized capsules (3 ml.) which were connected to feeder tubes inserted into the trunks of the trees along a circumference thereof at 4 to 6 inch intervals. The wilt condition of the olive trees disappeared and there was increased vigor and growth within a short period following the time of treatment. As to the Dutch elm disease, the rate of infestation was significantly arrested.

Other ingredients which can be advantageously combined with the compositions of this invention include antibiotics, metal chelates, systemic insecticides, sugars, other fungicides, growth regulants and the like.

EXAMPLES

The following examples further illustrate the invention. In each of the examples, benomyl is 50 percent by weight of a mixture of benomyl and extender. Thus, the net weight of benomyl in each example is one-half of the actual weight set forth for this composition.

Example I

The extender in a sample of a benomyl/extender mixture was extracted therefrom by washing the mixture through a filter with hot water. The benomyl residue was dried and 3 grams of the dried composition were dissolved in 30 ml. of dimethyl sulfoxide. 2.1 ml. of 85 percent lactic acid were added to the benomyl solution and the temperature thereof raised to 220 degrees F. Upon completion of the heating step, 210 ml. of dimethyl sulfoxide were added to the solution to effect cooling. To 100 ml. of the cooled solution which had a pH of 4.6, there was added 100 ml. of distilled water without the formation of any floc or precipitate. 1 gram of a 50 percent sodium hydroxide solution was added to the aqueous solution and the pH was raised to 9.5. The solution became cloudy and a precipitate formed which was separated from its fluid environment by filtration. The residue was washed with distilled water until the filtrate had a pH of 5.7 and then dried.

The dried residue was analyzed to determine its chemical composition, molecular weight and structural formula.

A portion of the residue was mixed with potassium bromide and the mixture compressed into a transparent pellet which was analyzed with a Perkins-Elmer infrared spectrophotometer, Model 137, having a spectrum from 2.5 to 15 microns. The readout showed distinctive peaks as follows: sharp peak at 3 microns; broad peak at 3.6 microns; double peak at 6.1 and 6.3 microns; and sharp peaks at 6.9, 7.5, 7.8 and 7.9 microns.

Elemental analysis of the residue was undertaken for carbon, hydrogen, oxygen and nitrogen. Carbon and hydrogen were determined by a Carbon-Hydrogen Analyzer; nitrogen was determined by the Micro-Kjeldahl method; and oxygen was determined by difference. The results were as follows: carbon 58%, hydrogen 6.6%, nitrogen 15.8% and oxygen 19.6%.

Molecular weight was determined by dissolving a quantity of the residue in camphor and measuring the lowering of the melting point. Molecular weight by this method was found to be 330.

The residue had the following empirical formula:
$$C_{16}H_{25}N_4O_4$$
and a theoretical molecular weight of 337.

The residue was 1-(butylcarbamoyl)-2-(methylamino)-benzimidazolium lactate which has the following structural formula:

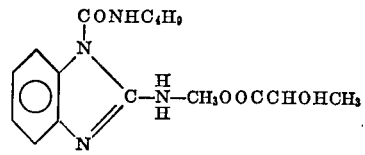

Example II 1.0 gram of benomyl plus extender and 0.35 ml. of 85% lactic acid were added to 5 ml. of dimethyl sulfoxide. The solution was heated under agitation and there was clouding and release of carbon dioxide starting at approximately 180 degrees F. The reaction diminished above 200 degrees F. and ceased and the fluid system became clear between 230 degrees F. and 240 degrees F. The temperature of the solution was raised to 250 degrees F. and was cooled with 30 ml. of dimethyl sulfoxide. To a portion of the cooled solution of 1-(butylcarbamoyl)-2-(methylamino) - benzimidazolium lactate, there was added an equal volume of water which resulted in a solution having slight turbidity but no flocculation or precipitation.

Example III 1.0 gram of benomyl plus extender was added to 5 ml. of dimethyl sulfoxide and the solution was heated under agitation to a temperature between 90 and 100 degrees F. at which temperature 0.35 ml. of 85% lactic acid and 30 ml. of dimethyl sulfoxide were added thereto. The resulting solution was heated to clarity at a temperature

Example IV 1.0 gram of benomyl plus extender was added to 5 ml. of dimethyl sulfoxide and the solution was heated under agitation to a temperature of 150 degrees F. At this temperature 0.35 ml. of 85% lactic acid was added thereto and heating was continued until the solution clarified at a temperature between 230 and 240 degrees F. The clarified solution of the lactate identified in Example I was cooled with 30 ml. of dimethyl sulfoxide.

Example V

Using the procedure set forth in Example IV, the following acids were satisfactorily substituted for lactic acid, on a mole to mole basis, to prepare the corresponding 1-(butylcarbamoyl)-2-(methylamino) - benzimidazolium salts: ascorbic, glacial acetic, citric, glycolic, fumaric, chloroacetic, malic, oxalic and succinic.

Example VI 1.0 gram of benomyl plus extender was added to 5 ml. of dimethylformamide and the solution was heated under agitation to clarity at 190 degrees F. To the heated solution, there was added 0.35 ml. of 85% lactic acid and the temperature was increased to 280 degrees F. to produce the lactate identified in Example I. The solution was cooled with 46 ml. of dimethylformamide.

Example VII 1.0 gram of benomyl plus extender was added to 5 ml. of diethylene glycol ethyl ether and the solution was heated under agitation to clarity at 240 degrees F. The solution was cooled to 150 degrees F., 0.35 ml. of 85% lactic acid was added thereto and the temperature was increased to 290 degrees F. to produce the lactate identified in Example I. Cooling was effected by adding 45 ml. of diethylene glycol ethyl ether to the solution.

Example VIII 1.0 gram of benomyl plus extender was added to 5 ml. of N,N-dimethylacetamide and the solution was heated under agitation to clarity at 175 degrees F. 0.35 ml. of 85% lactic acid were added thereto and heating was continued until the temperature reached 260 degrees F. to produce the lactate identified in Example I. The solution was cooled with 46 ml. of N,N-dimethylacetamide.

To separate portions of the cooled solutions from Examples VI, VII and VIII containing 1-(butylcarbamoyl)-2-(methylamino)-benzimidazolium lactate, there was added an equal volume of water to each and the resulting solutions did not develop any turbidity, floc or precipitate.

Example IX 75 grams of benomyl plus extender and 26 ml. of 85% lactic acid were added to 275 ml. of dimethyl sulfoxide and the solution was heated under agitation to 275 degrees F. to produce the lactate identified in Example I. 2900 ml. of dimethyl sulfoxide containing 52.2 grams of disodium ferrous ethylenediaminetriacetate (14% iron chelate) were added to the lactate salt prepared by the heating and reaction step.

Example X 0.1 gram of 56.3% streptomycin sulfate was added to 250 grams of the composition prepared in accordance with the procedure of Example IX.

Examples IX and X illustrate that additives such as iron chelates and antibiotics are compatible with the compositions of this invention.

That which is claimed is:

1. An organic acid addition salt of 1-(butylcarbamoyl)-2-(methylamino)-benzimidazole wherein the organic acid is selected from the group consisting of lactic, ascorbic, citric, glycolic, malic, tartaric, fumaric, malonic, oxalic, succinic, acetic and chloroacetic acids.

2. A salt according to claim 1 which is 1-(butylcarbamoyl)-2-(methylamino)-benzimidazolium lactate.

3. A salt according to claim 1 which is 1-(butylcarbamoyl)-2-(methylamino)-benzimidazolium ascorbate.

4. A salt according to claim 1 which is 1-(butylcarbamoyl)-2-(methylamino)-benzimidazolium citrate.

5. A salt according to claim 1 which is 1-(butylcarbamoyl)-2-(methylamino)-benzimidazolium glycolate.

6. A salt according to claim 1 which is 1-(butylcarbamoyl)-2-(methylamino)-benzimidazolium malate.

7. A salt according to claim 1 which is 1-(butylcarbamoyl)-2-(methylamino)-benzimidazolium tartrate.

8. A salt according to claim 1 which is 1-(butylcarbamoyl)-2-(methylamino)-benzimidazolium fumarate.

9. A salt according to claim 1 which is 1-(butylcarbamoyl)-2-(methylamino)-benzimidazolium malonate.

10. A salt according to claim 1 which is 1-(butylcarbamoyl)-2-(methylamino)-benzimidazolium oxalate.

11. A salt according to claim 1 which is 1-(butylcarbamoyl)-2-(methylamino)-benzimidazolium succinate.

12. A method for preparing an organic acid addition salt of 1 - (butylcarbamoyl)-2-(methylamino)-benzimidazole wherein the organic acid is selected from the group consisting of lactic, ascorbic, citric, glycolic, malic, tartaric, fumaric, malonic, oxalic, succinic, acetic and chloroacetic acids which comprises heating methyl 1-(butylcarbamoyl)-2-benzimidazolecarbamate and an organic acid selected from the organic acid group hereinabove identified in about stoichiometric proportion in a polar solvent selected from the group consisting of dimethyl sulfoxide, diethylene glycol ethyl ether, N,N-dimethylacetamide and dimethylformamide to a temperature from about 175° F. to about 315° F.

13. A method according to claim 12 wherein the polar solvent is dimethyl sulfoxide.

14. A method according to claim 12 wherein the polar solvent is diethylene glycol ethyl ether.

15. A method according to claim 12 wherein the polar solvent is N,N-dimethylacetamide.

16. A method according to claim 12 wherein the polar solvent is dimethylformamide.

17. A method according to claim 12 wherein the organic acid is lactic acid and the polar solvent is dimethyl sulfoxide.

18. A method according to claim 12 wherein the organic acid is ascorbic acid and the polar solvent is dimethylsulfoxide.

References Cited

UNITED STATES PATENTS

| | | | |
|---|---|---|---|
| 3,399,212 | 8/1968 | Hoover et al. | 260—309.2 |
| 3,573,321 | 3/1971 | DiCuollo et al. | 260—309.2 |

FOREIGN PATENTS

| | | | |
|---|---|---|---|
| 2,003,841 | 7/1970 | Germany | 260—309.2 |

OTHER REFERENCES

Adams et al.: Chem. Rev., vol. 65, pp. 573–4 relied on (1965).

Smith: The Chemistry of Open-Chain Organic Nitrogen Compounds, vol. I, pp. 260–1 relied on, N.Y., Benjamin, 1965.

Chabrier et al.: Comptes rendus, vol. 238, pp. 1593–5.
Chabrier et al.: Chem. Abst., vol. 49, column 15742 (1955).

NATALIE TROUSOF, Primary Examiner

U.S. Cl. X.R.

424—273